(12) United States Patent
Falahati et al.

(10) Patent No.: US 8,537,853 B2
(45) Date of Patent: Sep. 17, 2013

(54) SIDE INFORMATION BITS OF ACK AND NACK BITS IN MULTIPLE ACK/NACK TRANSMISSION

(75) Inventors: Sorour Falahati, Stockholm (SE); David Astely, Bromma (SE); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 304 days.

(21) Appl. No.: 12/933,301

(22) PCT Filed: Nov. 3, 2008

(86) PCT No.: PCT/SE2008/051249
§ 371 (c)(1),
(2), (4) Date: Sep. 17, 2010

(87) PCT Pub. No.: WO2009/116915
PCT Pub. Date: Sep. 24, 2009

(65) Prior Publication Data
US 2011/0013536 A1  Jan. 20, 2011

Related U.S. Application Data

(60) Provisional application No. 61/038,214, filed on Mar. 20, 2008.

(51) Int. Cl.
*H04J 3/16* (2006.01)
(52) U.S. Cl.
USPC .......................................................... 370/465

(58) Field of Classification Search
None
See application file for complete search history.

(56) References Cited

U.S. PATENT DOCUMENTS

| 2004/0266358 | A1  | 12/2004 | Pietraski et al. |
| 2005/0201486 | A1* | 9/2005  | Han et al. .................. 375/295 |
| 2006/0165190 | A1* | 7/2006  | Tamaki et al. ............. 375/262 |
| 2007/0217540 | A1  | 9/2007  | Onggosanusi et al. |

FOREIGN PATENT DOCUMENTS

WO  2007/109256 A2  9/2007

\* cited by examiner

*Primary Examiner* — Raj Jain
(74) *Attorney, Agent, or Firm* — Coats & Bennett, P.L.L.C.

(57) ABSTRACT

Methods and apparatus for generating, transmitting, and processing error control information in a wireless communication system are disclosed. The error control information is designed so that the probability of a NACK-to-ACK error in transmission is lower than the probability for an ACK-to-NACK error. Multiple ACK/NACK bits are transmitted along with one or more side information bits that indicate the relative quantities of ACK values and NACK values among the ACK/NACK bits. In an exemplary method for generating error control information in a communication device, a plurality of ACK/NACK bits indicating whether corresponding transport blocks were successfully received are generated. One or more side information bits are formed as a function of the ACK/NACK bits, the side information bits indicating the relative quantities of ACK values and NACK values among the ACK/NACK bits, and transmitted along with the ACK/NACK bits to the remote communication node.

30 Claims, 6 Drawing Sheets

FIG. 11 though understanding of the invention is hereby incorporated by reference herein.

SIDE INFORMATION BITS OF ACK AND NACK BITS IN MULTIPLE ACK/NACK TRANSMISSION

TECHNICAL FIELD

The present invention generally relates to wireless communication systems, and particularly relates to error control techniques for use in such systems.

BACKGROUND

The $3^{rd}$-Generation Partnership Project (3GPP) is currently developing a next-generation wireless communication system in its Long-Term Evolution (LTE) initiative. A key requirement for LTE is frequency flexibility. To this end, multiple carrier bandwidths ranging from 1.4 MHz to 20 MHz are supported. In addition, frequency-division duplexing (FDD) and time-division duplexing (TDD) are both supported, so that either paired or unpaired spectrum may be used in a particular area. In FDD systems, frequencies used in the downlink (the link from the base stations to the mobile terminals) and the uplink (the link from mobile terminals to base stations) differ. Thus, uplink and downlink transmissions between a base station and a mobile station may be simultaneous. In TDD systems, however, uplink and downlink transmissions use the same frequency band, and may not occur simultaneously. Hence, the available resources must be divided in time between the uplink and the downlink. By allocating different proportions of time (generally in terms of the number of subframes of a radio frame) to uplink and downlink, it is possible to adapt to asymmetric traffic and resource needs in the uplink and downlink.

This potential asymmetry between uplink and downlink resources leads to another significant difference between FDD and TDD. While the same number of uplink and downlink subframes is available during a radio frame in an FDD system, the number of uplink and downlink subframes may differ for a TDD system. In an FDD system, every downlink subframe can be associated with an uplink subframe, which allows feedback to be sent in a one-to-one fashion. Thus, it is possible for a mobile terminal to send feedback in response to each downlink assignment of resources in a corresponding uplink subframe, subject only to a processing delay. In a TDD system, however, the uplink and downlink are discontinuous, and, more importantly, may be unbalanced in a given radio frame. Thus, it may not be possible to construct a one-to-one association, even with the help of a certain delay. For the typical case with more downlink subframes than uplink subframes, it is often the case that the feedback from two or more downlink subframes must be transmitted in a single uplink subframe. Error control techniques that account for these differences must therefore be implemented.

SUMMARY

For time-division duplexing (TDD) operation in Long-Term Evolution (LTE) wireless systems, there is a need to transmit multiple ACK/NACKs from a single mobile terminal in a single uplink subframe. Embodiments of the present invention include methods and apparatus for generating, transmitting, and processing error control information in such systems. Although described here in a TDD scenario, those skilled in the art will appreciate that these techniques may be applied more generally, including in a frequency-division duplexing (FDD) LTE scenario.

Using the techniques disclosed herein, multiple ACK/NACK bits may be transmitted to a remote communication node in a manner such that the probability of a NACK-to-ACK error caused by impairments in the transmission channel is lower than the probability for an ACK-to-NACK error. In some embodiments of the present invention, this is accomplished by transmitting the multiple ACK/NACK bits along with one or more side information bits that indicate the relative quantities of ACK values and NACK values among the ACK/NACK bits. In some embodiments, the individual ACK/NACK bits and the one or more side information bits are encoded before transmission. For instance, a conventional block encoder may be used to jointly encode the ACK/NACK bits and the one or more side information bits. In some embodiments, the side information may comprise an indicator as to whether the majority of encoded bits are NACKs or ACKs. In some embodiments, the side information may indicate whether there is at least one NACK.

In an exemplary method for generating error control information in a communication device, such as a mobile terminal, a plurality of ACK/NACK bits are generated, each ACK/NACK bit indicating whether a corresponding transport block received from a remote communication node was successfully decoded. One or more side information bits are formed as a function of the ACK/NACK bits, the side information bits indicating the relative quantities of ACK values and NACK values among the ACK/NACK bits, and transmitted along with the ACK/NACK to the remote communication node.

In some embodiments, the ACK/NACK bits and the one or more side information bits are encoded to form a coded error control word, which is transmitted to the remote communication node. In some of these embodiments, a block encoder is used. In some embodiments, the one or more side information bits include at least one side information bit indicating whether the majority of the ACK/NACK bits have NACK values; in some embodiments two or more duplicate side information bits are formed.

Corresponding methods for processing error control information in a communication system, such as might be implemented at a base station, are also disclosed. In an exemplary method, a plurality of ACK/NACK bits and one or more side information bits transmitted by a remote communication device, such as a mobile terminal, are received and estimated. In some embodiments, the receiving and estimating of the ACK/NACK bits and side information bits comprises receiving a coded error control word transmitted by the remote communication device and decoding the coded error control word, such as with a block decoder, to obtain the estimated ACK/NACK bits and the estimated one or more side information bits. In any case, the estimated ACK/NACK bits are evaluated in view of the estimated side information bits to determine the reliability of the estimated ACK/NACK bits. In some embodiments, this evaluation comprises forming one or more test bits as a function of the estimated ACK/NACK bits, the test bits indicating the relative quantities of ACK values and NACK values among the estimated ACK/NACK bits, and comparing the test bits to the estimated side information bits to determine the reliability of the estimated ACK/NACK bits. In some embodiments it is assumed that none of the transport blocks were successfully decoded if it is determined that the estimated ACK/NACK bits are unreliable.

Wireless communication devices corresponding to the methods described herein are also disclosed. Of course, those skilled in the art skilled in the art will appreciate that the present invention is not limited to the above features, advantages, contexts or examples, and will recognize additional

DETAILED DESCRIPTION

Described herein are various methods and apparatus for generating, transmitting, and processing error control information in a wireless communication system. Although described herein with respect to the time-division duplexing (TDD) Long-Term Evolution (LTE) system specified by the $3^{rd}$-Generation Partnership Project (3GPP), those skilled in the art will appreciate that the present invention is not limited to such a context and may be applied to other communications systems in which a plurality of ACK/NACK bits may be processed simultaneously.

Figure 1:
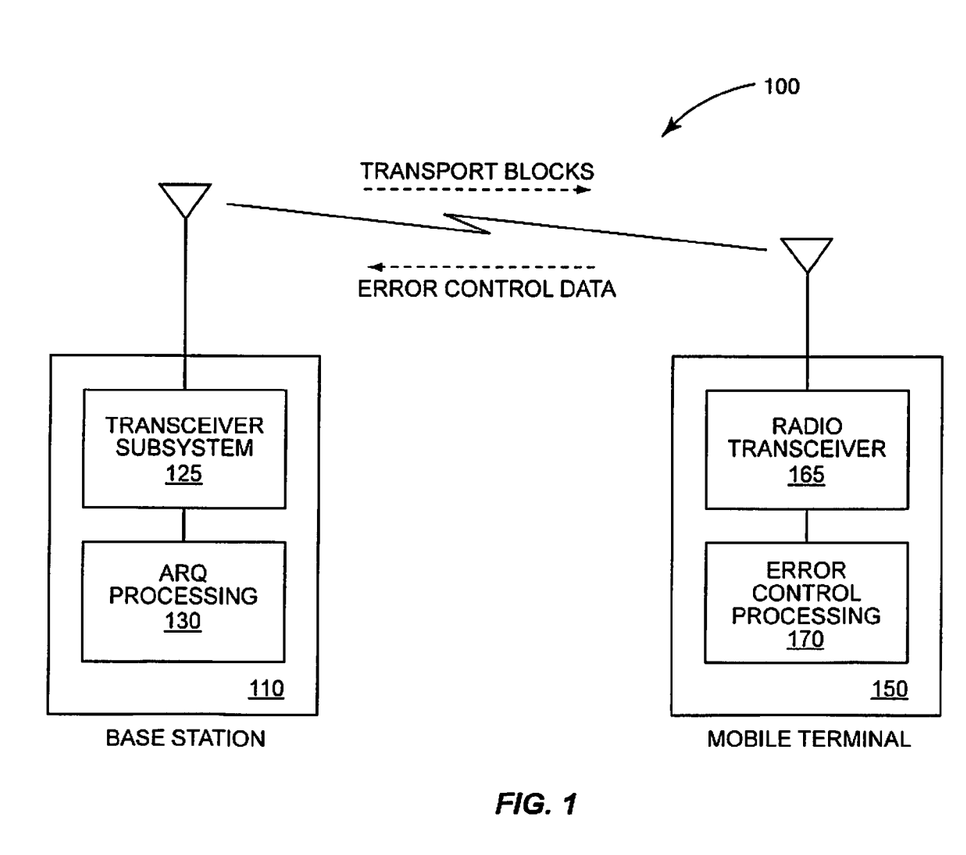
FIG. 1 is a block diagram of a wireless communication system according to some embodiments.

FIG. 1 provides a simplified view of a wireless communication system 100 according to some embodiments of the present invention. Wireless system 100 includes a base station 110, which may be a LTE Node B as generally specified by 3GPP, as well as a mobile terminal 150. Mobile terminal 150 is configured to operate according to one or more wireless communication protocols, including one or more protocols supported by base station 110. Base station 110 includes a transceiver subsystem 125 for sending and receiving data to and from mobile terminal 150 and an ARQ processing function 130 for processing error control data received from the mobile terminal 150. In an LTE system, downlink (base station-to-mobile) data is transmitted in the form of "transport blocks"; error control data, in the form of ACK/NACK bits, is transmitted on the uplink (mobile-to-base station) in response. Mobile terminal 150 thus includes a radio transceiver 165, adapted for communication with base station 110, as well as an error control processing unit 170. The operation of ARQ processing function 130 and error control processing unit 170 are described in further detail in the discussion that follows. Those skilled in the art will appreciate that the block diagram of FIG. 1 necessarily omits numerous features that are not necessary to a complete understanding of the invention.

Figure 2:
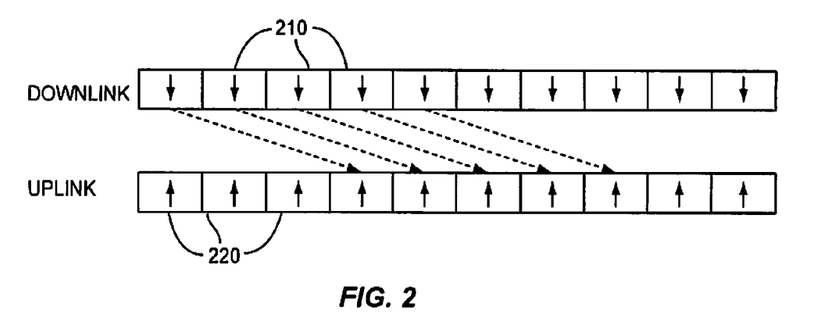
FIG. 2 is a block diagram illustrating uplink and downlink frames in a frequency division duplexing (FDD) system.

As noted above, the need to transmit multiple ACK/NACKs in a single uplink subframe may arise in a time-division duplexing (TDD) Long-Term Evolution (LTE) system. This specific problem need not arise in a frequency-division duplexing (FDD) system, because every downlink subframe can be associated with an uplink subframe. This is illustrated in FIG. 2, which illustrates uplink and downlink frames in an FDD system, the uplink and downlink frames comprising ten downlink subframes 210 and ten uplink subframes 220, respectively. In the pictured example, a processing delay of two subframes is assumed. Thus, an ACK or NACK for a downlink transmission in a given downlink subframe 210 may be transmitted via a corresponding uplink subframe three subframes later.

Figure 3:
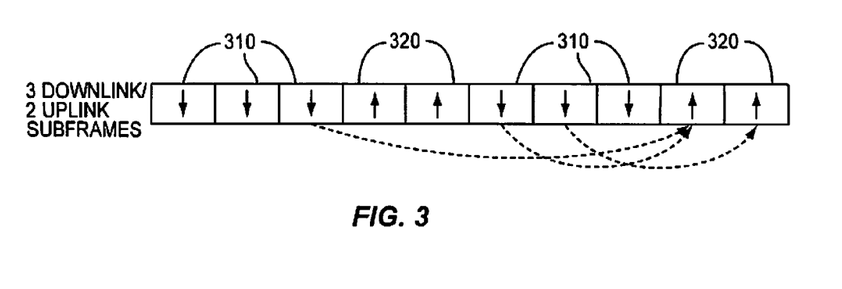
FIG. 3 shows an example of one possible configuration in a time division duplexing (TDD) system.

The situation is different for a TDD system having differing numbers of uplink and downlink subframes, however. FIG. 3 provides an example of one possible configuration, in which a frame is divided into two half-frames, each of which includes three downlink subframes 310 and two uplink subframes 320. In the pictured example, ACK/NACK reports for two of the downlink subframes are transmitted in a single one of the uplink subframes, while the ACK/NACK report for the remaining downlink subframe is transmitted in the other uplink subframe.

Figure 4:
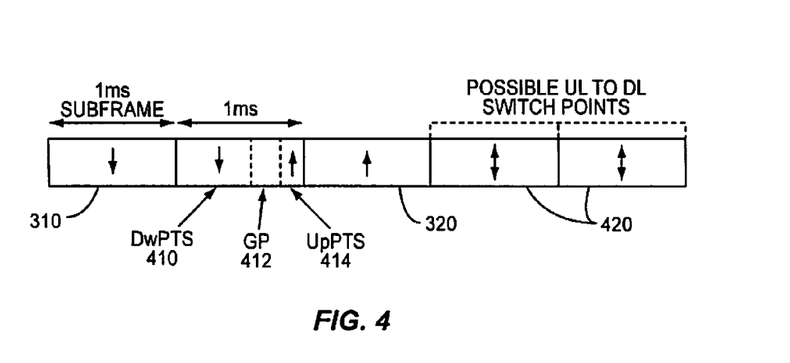
FIG. 4 shows an example of a 10-millisecond radio frame divided into two half-frames of five milliseconds duration.

An unbalanced situation such as that pictured in FIG. 3 will frequently arise in LTE systems configured for TDD operation. In LTE, a radio frame of 10-milliseconds duration is divided into ten subframes, each one millisecond long. In case of time-division duplexing, each subframe (except for one, as discussed more fully below) is either assigned to uplink or downlink. Thus, uplink and downlink transmission at the same time is not permitted. Furthermore, each 10-millisecond radio frame is divided into two half-frames of five milliseconds duration, where each half-frame consists of five subframes as shown in FIG. 4.

The first subframe of an LTE radio frame is always allocated for downlink transmission. The second subframe is split into three special fields, as shown in FIG. 4: DwPTS 410, GP 412, and UpPTS 414. Together these fields form an entire subframe, with a total duration of 1 ms. UpPTS 414 (uplink pilot timeslot) is used for uplink transmissions of sounding reference signals and, in some configurations, reception of a shorter random access preamble. Neither data nor control signaling may be transmitted in UpPTS 414. GP 412 (guard period) is used to create a guard period to ensure that a mobile terminal transmitting the UpPTS 414 does not interfere with other mobile terminals receiving the DwPTS 410, and may be configured for a particular cell with a length that is based on the radius of the cell. DwPTS 410 (downlink pilot timeslot) is used for downlink transmission of data much like any other downlink subframe 310, except that it has a shorter duration.

Figure 5:
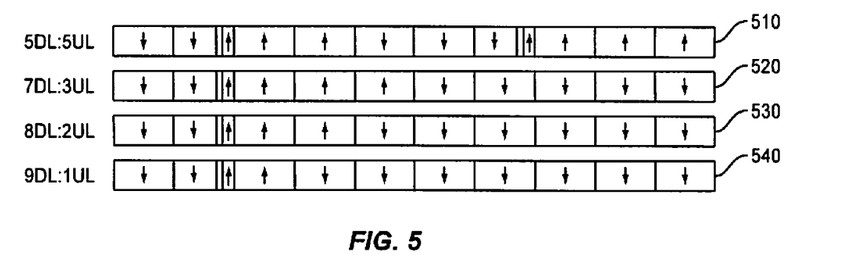
FIG. 5 show several possible TDD configurations according to one or more embodiments.

Various allocations of the remaining sub-frames to uplink and downlink use are supported. Some of these allocations have a 5-millisecond periodicity, where the second half-frame has an identical structure to the first. Other allocations have a 10-millisecond periodicity where the half-frames are not identical. In some configurations, the second half-frame contains only resources for downlink transmission. Several possible configurations are shown in FIG. 5, including frame 510, which has five downlink subframes and five uplink subframes, frame 520, which has seven downlink subframes and three uplink subframes, frame 530, which has eight downlink subframes and two uplink subframes, and frame 540, with nine downlink subframes and one uplink subframe. Of course, other configurations than those pictured are possible.

LTE uses a hybrid ARQ error control process. Thus, after receiving downlink data in a given subframe, mobile terminal 150 attempts to decode it and reports to the base station 110 whether the decoding was successful (ACK) or not (NACK). In the event of an unsuccessful decoding attempt, as indicated by a NACK, the base station 110 can simply retransmit the erroneous data.

Like other data, transmitted ACK/NACK reports may be protected by one or more error control processes, although such protection is not required. For instance, ACK/NACK bits may be encoded (either alone, or with other bits) to add redundancy and increase the reliability of the transmitted information. When considering error protection for ACK/NACK bits, however, the effects of unreliable transmission should be carefully considered, to ensure that overall error control goals for transmitted data are met while minimizing unnecessary retransmissions of data.

In fact, the effect of an unreliably received ACK bit is quite different than the effect of an unreliably received NACK bit. An ACK to NACK error, i.e., when a transmitted ACK is incorrectly decoded as a NACK, will generally cause an extra retransmission of the associated transport block. Although this extra retransmission is undesirable, because of the unnecessary allocation of resources for retransmission, it is easily handled using higher layer ARQ protocols and does not cause data corruption. However, in the event that a NACK is incorrectly demodulated as ACK, an erroneous transport block is delivered to higher layers. This error event has a more severe impact on the performance since the receiver incorrectly assumes that the transmitted data is perceived correctly. Although this error can be corrected with higher layer Radio Link Control (RLC) protocols, these processes are less efficient and cause extra delays, which may have significant impact on the performance. For these reasons, the typical requirement for ACK to NACK error is set at around 1%, whereas the requirement for a NACK to ACK error is much tighter, e.g., around 0.01-0.1%.

In LTE systems, downlink transmissions are dynamically scheduled. The base station transmits control information in each subframe, indicating which terminals are supposed to receive data on which resources (i.e., resource blocks) in the current downlink subframe. This control signaling is transmitted in the first 1, 2 or 3 OFDM symbols in each subframe. A mobile terminal will thus listen to the control channel, and if it detects a downlink assignment addressed to it, it will decode the corresponding data and generate feedback in response to the transmission. This feedback takes the form of an ACK or a NACK, depending on whether the data was decoded correctly or not. From the control channel signals, the terminal can determine the corresponding uplink control channel resource for transmitting the feedback to the base station.

In an LTE FDD system, for example, a mobile terminal, in response to a detected downlink assignment in subframe n, may simply send an ACK/NAK report in a later uplink subframe at a particular delay, e.g., in subframe n+4. If Multiple-Input Multiple-Output (MIMO) multi-layer transmission is used, two transport blocks may be transmitted in a single downlink subframe, and the terminal will respond with two ACK/NACK reports in the corresponding uplink subframe.

In an LTE TDD system, however, there is not a one-to-one relation between uplink and downlink subframes. Thus, the terminal can not always send an ACK/NACK in response to a downlink assignment in subframe n in uplink subframe n+4, since this subframe may not be allocated for uplink transmission. Also, the number of downlink subframes may be larger than the number of uplink subframes, in which case multiple ACK/NACKs corresponding to assignments in multiple downlink subframes may need to be sent in a single uplink subframe. Hence, each of several downlink subframes in a radio frame may be associated with a single uplink subframe, subject to a certain minimum processing delay. Thus, for example, ACK/NACKs in response to downlink assignments in subframe n may be reported in subframe n+k, with k>3 (to account for processing delay in the receiver). Furthermore, since the downlink subframes can be scheduled independently of each other, a mobile terminal may be assigned an arbitrary number of downlink subframes from those available. Thus, uplink control signaling needs to support the feedback of multiple ACK/NACK reports from a mobile terminal in a given uplink subframe.

Figure 6:
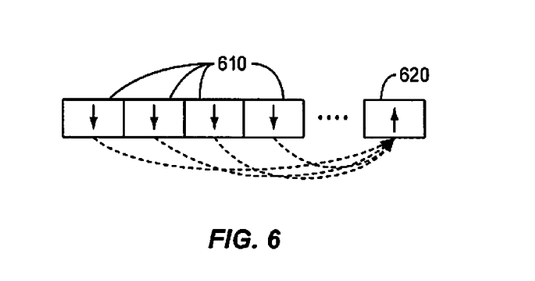
FIG. 6 shows the mapping of ACK/NACK bits for four downlink subframes to a single uplink subframe.

This principle is illustrated in FIG. 6, which shows the mapping of ACK/NACK bits for four downlink subframes 610 to a single uplink subframe 620. For a given uplink subframe, the number of associated downlink subframes depends on how the base station 110 has allocated subframes between uplink and downlink. In some cases, the number of associated downlink subframes may differ for different uplink subframes.

As noted above, error control techniques such as redundancy coding may be applied to ACK/NACK bits to enhance the reliability of transmission. One basic solution is to use a standard coding scheme, such as a block code or a tail-biting convolutional code, to jointly encode the plurality of ACK/NACK bits transmitted by the mobile terminal 150 in a given subframe.

However, these coding schemes do not take into account whether a given bit comprises an ACK or a NACK. In other words, these schemes treat ACK values and NACK values equally, and thus yield the same error probability for NACK to ACK error as well as for ACK to NACK error. As discussed above, the desired error probabilities are very different. Thus, with a standard coding approach, meeting the target error probability for NACK-to-ACK error means that the error probability for ACK-to-NACK error becomes unnecessarily low. Accordingly, there is room for efficiency improvements in encoding the ACK/NACK reports.

The above scheme may be modified, according to several embodiments of the present invention, to provide a scheme that provides more protection for the NACK values than for the ACK values, so that errors in decoding transmitted NACKs are more reliably detected. This consequently provides unequal error probabilities for the error events discussed above.

In various embodiments of the present invention, a communication device generates "side information" from a plurality of ACK/NACK bits, wherein each ACK/NACK bit indicates whether a corresponding transport block received from a remote communication node was successfully decoded. The side information, which may comprise one or more bits, provides an indication as to the relative quantities of ACK values and NACK values among the ACK/NACK bits, and is transmitted to the remote communication node along with the ACK/NACK bits. The side information assists the remote communication node in decoding the NACK bits with increased reliability, compared to ACK bits.

Figure 7:
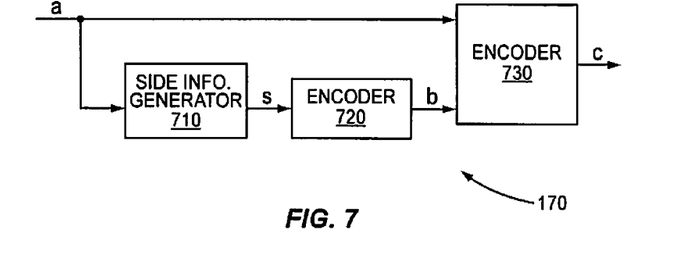
FIG. 7 is a block diagram of an error control processing unit according to one or more embodiments.
Figure 8:
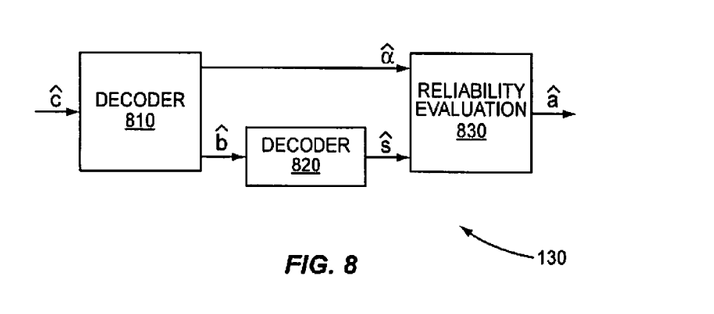
FIG. 8 is a block diagram of a an ARQ processing function according to one or more embodiments.

Although the ACK/NACK bits and the corresponding side information bits may be transmitted without error protection, encoding the ACK/NACK bits and side information bits allows the transmission reliability to be improved for marginal signal conditions. Thus, an exemplary error control processing unit 170, such as might be embodied in mobile terminal 150, is shown in FIG. 7, and includes a side information generator 710, a first encoder 720, and a second encoder 730. A corresponding ARQ processing function 130, such as might be embodied in base station 110, comprises a first decoder 810, a second decoder 820, and a reliability evaluation function 830.

Referring first to the error control processor 170 of FIG. 7, a is a binary vector of size $M_{in}$ containing $M_{in}$ ACK/NACK bits corresponding to transport blocks received by mobile terminal 150. In a conventional system, the $M_{in}$ bits of a might be encoded with a block encoder to yield an encoded bit sequence of length $M_{out}$ (where $M_{out} > M_{in}$). The redundancy added by the encoder is then exploited by a corresponding decoder at the opposite end of the wireless link to improve the transmission reliability for the transmitted information bits.

As noted above, this conventional approach results in equal probabilities for detecting errors in transmitted ACK values and NACK values. Accordingly, the exemplary error control processor 170 of FIG. 7 uses the ACK/NACK bits of a to generate one or more side information bits, represented in FIG. 7 as vector s, with length K. This side information contains some logical information about the contents of a, and provides additional protection for NACK bits (as compared to ACK bits) when transmitted along with the ACK/NACK bits. In general, the side information provides an indication of the relative quantities of ACK values and NACK values among the ACK/NACK bits a. For instance, the side information s may in some embodiments consist of a single bit indicating whether a majority of the ACK/NACK bits carry ACK values. In other embodiments, the side information may include a bit indicating whether there is at least one NACK. Combinations of these are possible; thus, in some embodiments a first side information bit indicates whether the majority of ACK/NACK bits carry NACK values, while a second side information bit indicates whether at least one bit carries a NACK value.

The transmission reliability of the side information bit or bits can be enhanced by adding redundancy information, i.e., by using an encoder that maps the K bits of s to a larger binary vector b of size M. In some embodiments, this encoding may be as simple as duplicating one or more of the K bits of s, although more complex schemes may also be used.

In any event, the encoded information bits b are supplied to encoder 730, along with the original ACK/NACK bits a. The encoder 730 encodes a and b, either jointly or separately, into a coded error control word c, having $M_{out}$ bits. In some embodiments, encoder 730 may comprise a block encoder. The coded error control word c is transmitted to the remote communications node; as will be explained in further detail below, this approach provides unequal transmission reliability for ACK values and NACK values, facilitating a more efficient use of system resources.

At the other end of the wireless link, as shown in FIG. 8, ARQ processing function 130 includes a decoder 810, which takes a received error control word ĉ and decodes it to obtain estimated ACK/NACK bits $\hat{\alpha}$ and estimated encoded side information $\hat{b}$. The decoding operation of decoder 810 effectively reverses the encoding operation of encoder 730. However, because the error control word is generally transmitted over a noisy channel, the output from 810 comprises an estimate of the originally encoded bits; the reliability of the estimate is a function of the channel conditions and the encoding scheme employed.

As pictured in FIG. 8, a second decoder 820 decodes the estimated encoded side information $\hat{b}$ to obtain estimated side information $\hat{s}$. This decoding process effectively reverses the encoding process performed in the encoder 720 of FIG. 7. A reliability evaluation unit 830 then evaluates the estimated ACK/NACK bits $\hat{\alpha}$, in view of the estimated side information $\hat{s}$, to obtain detected ACK/NACK bits â. As will be demonstrated below, the resulting estimated ACK/NACK bits â will have differing probabilities of error depending on whether each of the corresponding transmitted bits carried an ACK value or a NACK value.

The side information generator 710 at the mobile station 150 and the reliability evaluation function 830 at the base station 110, as shown in FIG. 7 and FIG. 8, respectively, may be designed so that the transmission reliability of NACK bits is increased relative to the transmission reliability of ACK bits. Design details for one or more exemplary embodiments are described in the following. In the following discussion, it is assumed that a NACK and ACK bits are mapped to binary 0 and 1, respectively. Of course, those skilled in the art will appreciate that an alternate mapping may be used.

With regards to the side information generator 710, if $f(\cdot)$ denotes the function to generate the side information, then $f(a) = s$. In some embodiments of the present invention, $f(a) = s$ produces a single bit (i.e., K=1 and $s=(s_0)$), which takes a value of "1" if the majority of the ACK/NACK bits in a are NACK bits. In some of these embodiments, the side information encoder 720, which may be represented as function $g(\cdot)$, simply repeats the bits of s M times. In other words, $g(s) = b = (b_0, \ldots, b_{M-1}) = (s_0, \ldots, s_0)$. Finally, in some embodiments encoder 730, which may be represented by function $h(\cdot)$ comprises a Reed-Muller block encoder that jointly encodes [a, b], with $M+M_{in}$ bits, into c, containing $M_{out}$ bits. In such an embodiment, the block coding function of the encoder 730 may be denoted by $h(a,b) = RM(M+M\ M_{in}, M_{out})$, where the first and second parameters denote the number of input and output bits to/from the encoder, respectively.

At the ARQ processing function 130 in base station 110, a decoder 810 corresponds directly to the encoder 730 of the mobile terminal's error control processing unit 170. Thus, in the example given above, decoder 810 comprises a block decoder directly corresponding to the block encoding function $RM(M+M\ M_{in}, M_{out})$, and produces estimated ACK/NACK bits $\hat{\alpha}$ and encoded side information bits $\hat{b}$. If the encoded side information bits $\hat{b}$ are ignored, the estimated ACK/NACK bits $\hat{\alpha}$ have transmission reliabilities that are determined by the prevailing channel conditions and the redundancy provided by the block encoding process. However, the estimated ACK/NACK bits are not accepted until their reliability is assessed, using the side information.

For the structure described above, this assessment may be done by first determining the majority of the bits in $\hat{b} = (\hat{b}_0, \ldots, \hat{b}_{M-1})$; a bits $\hat{s} = (\hat{s}_0)$ is formed from this majority. In FIG. 8, this "decoding" of the encoded side information bits is performed by decoder 820. The resulting bit, $\hat{s}_0$, represents an estimate of the originally generated side information $s = (s_0)$. Next, the same side information generation function that was employed at the mobile terminal 150 (in side information generator 710) is applied to the estimated ACK/NACK bits $\hat{\alpha}$. Thus, $f(\hat{\alpha})$ is generated. The output $f(\hat{\alpha})$ is compared to $\hat{s}$, to see if they match. In case of agreement (i.e., if $f(\hat{\alpha}) = \hat{s}$), then $\hat{\alpha}$ is accepted as the detected ACK/NACK bits, i.e. $\hat{a} = \hat{\alpha}$. A disagreement indicates that one or more of the ACK/NACK bits were decoded incorrectly.

In the latter event, some embodiments may be configured to assume that all of the received ACK/NACK bits should have been received as NACKs, i.e., it is assumed that $\hat{a} = (\hat{a}_0, \ldots, \hat{a}_{M_{in}-1}) = (0, \ldots, 0)$. This is because the received ACK/NACK bits have been assessed as unreliable (as a group), hence it is preferable to retransmit all of the corresponding downlink transmissions to reduce the possibility of data corruption and/or invocation of higher layer ARQ processing. Although this may result in redundant retransmission attempts, and consequent extra delay and resource utilization, the outcome may in many circumstances result in more reliable transmission in general.

Those skilled in the art will appreciate that the foregoing method for generating and encoding side information is but one approach. Another approach would be to provide some reliability metric corresponding to each estimated ACK/NACK bit and make the decision based upon them. Those skilled in the art will also appreciate that the foregoing method and its variants may be employed with a variety of wireless stems, even though the techniques were described above with respect to an LTE system.

Simulations that highlight the benefits of the proposed scheme have been performed. In these simulations, a conventional scheme, in which a plurality of ACK/NACK bits are encoded for transmission, but not transmitted with side information, was compared to the exemplary scheme described above with respect to FIGS. 7 and 8, in which side information is generated and provided to the receiver. A comparison was performed for several scenarios, including the joint transmission of 4 and 8 ACK/NACK bits on an additive white Gaussian noise (AWGN) channel model. Results for both binary phase-shift keying (BPSK) and quadrature phase-shift keying (OPSK) modulations are given. The simulation parameters are given in the Table 1 below.

TABLE 1

Simulation parameters

| | |
|---|---|
| Number of ACK/NACK bits, $M_{in}$ | 4, 8 |
| Number of channel coded bits, $M_{out}$ | 24 for BPSK modulation 48 for QPSK modulation |
| Channel model | AWGN |
| Modulation | BPSK, QPSK |
| Number of receiver antennas | 2 |

Table 2, below, illustrates generation of the side information bit for 4 ACK/NACK bits, where the side information bit $s=(s_0)$ indicates whether the majority of bits in a are NACKs ('0's). The same logic is applicable for different number of ACK/NACK bits.

TABLE 2

Side information generation $f(a) = s$

| $a = (a_0, a_1, a_2, a_3)$ | $s = (s_0)$ |
|---|---|
| 0 0 0 0 | 1 |
| 0 0 0 1 | 1 |
| 0 0 1 0 | 1 |
| 0 0 1 1 | 1 |
| 0 1 0 0 | 1 |
| 0 1 0 1 | 1 |
| 0 1 1 0 | 1 |
| 0 1 1 1 | 0 |
| 1 0 0 0 | 1 |
| 1 0 0 1 | 1 |
| 1 0 1 0 | 1 |
| 1 0 1 1 | 0 |
| 1 1 0 0 | 1 |
| 1 1 0 1 | 0 |
| 1 1 1 0 | 0 |
| 1 1 1 1 | 0 |

An analysis of the simulation results reveals that the scheme employing side information provides unequal error probability for both considered error events (ACK bits detected as NACK bits, and vice versa). In particular, the error probability for NACK-to-ACK errors is several times less than for ACK-to-NACK errors, at low signal-to-noise ratios. In contrast, the original scheme provides equal error probability for both error events. The simulation also shows that the overall transmission performance may be improved by suitable selection of the design parameters, e.g., M. In fact, a considerable gain may be obtained, especially under poor channel conditions. Similar results obtain whether 4 or 8 ACK/NACK bits are transmitted.

It is interesting to note that the simulations reveal that large values of M (corresponding to increased redundancy in the encoded side information) yield higher error probabilities. This results from the fact that, as M increases, the coding rate of the outer encoder must operate at a higher coding rate, compared to the conventional scheme, to achieve the same number of output bits. Those skilled in the art will appreciate that an appropriate value of M may be easily determined for a given set of conditions, including the number of jointly encoded ACK/NACK bits, the number of channel coded bits, the channel model, the modulation, and so on.

In the particular example discussed herein, good results may be obtained by choosing M=1. This indicates that the inner encoder 720 and inner decoder 820 in FIGS. 7 and 8, respectively, may not be needed in some embodiments of the invention. Thus, one advantage of the scheme disclosed herein is that it provides sufficiently good performance and fulfills the error probability requirements while retaining a simple structure. More complex schemes may be employed, as necessary, to provide even more flexibility in setting error probabilities to desired levels. In general, using the techniques disclosed herein, the reliability of multiple ACK/NACK transmission where the control bits are jointly encoded may be improved, while providing more protection against error for NACK bits as compared to ACK bits.

Figure 9:
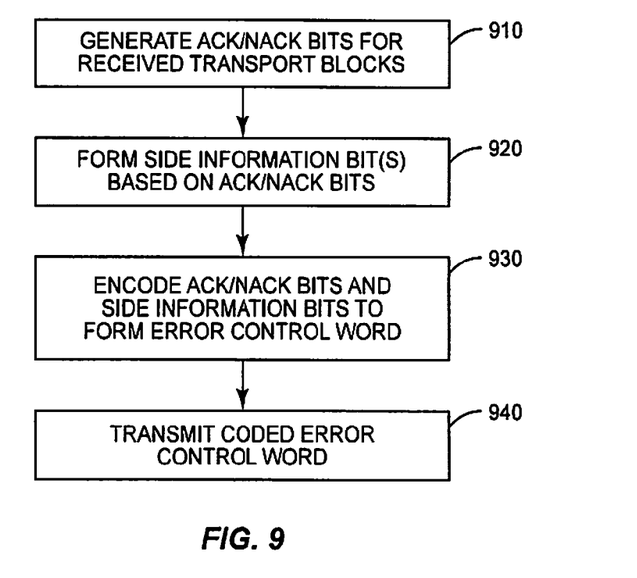
FIG. 9 is a process flow diagram of a method for generating error control information, based on ACK/NACK bits, for transmission to a remote node according to one embodiment.
Figure 10:
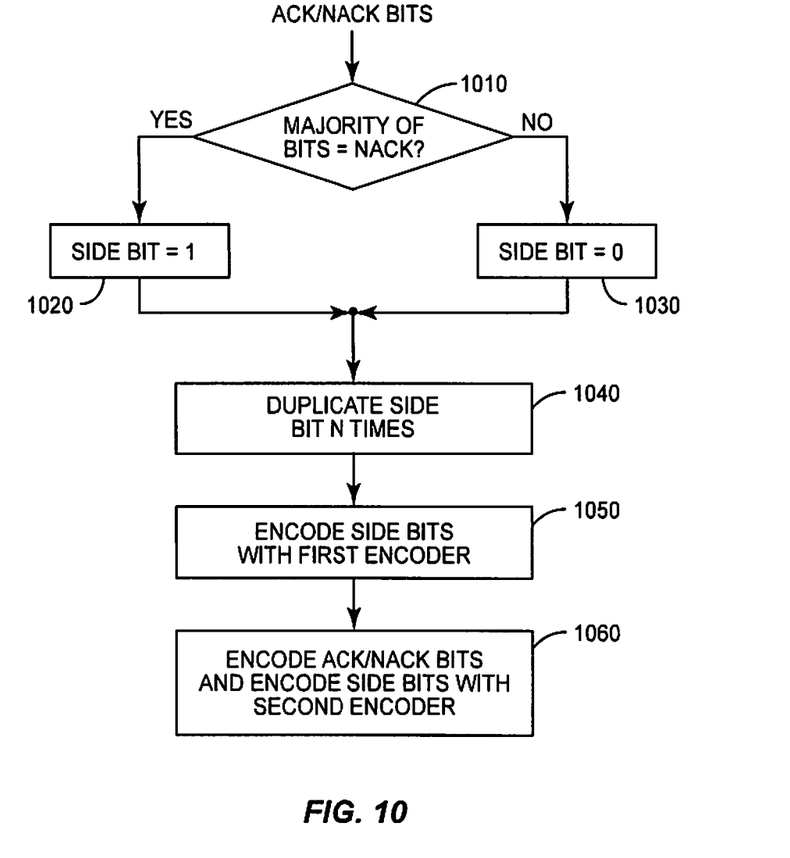
FIG. 10 is a process flow diagram of a method for generating error control information, based on ACK/NACK bits, for transmission to a remote node according to another embodiment.
Figure 11:
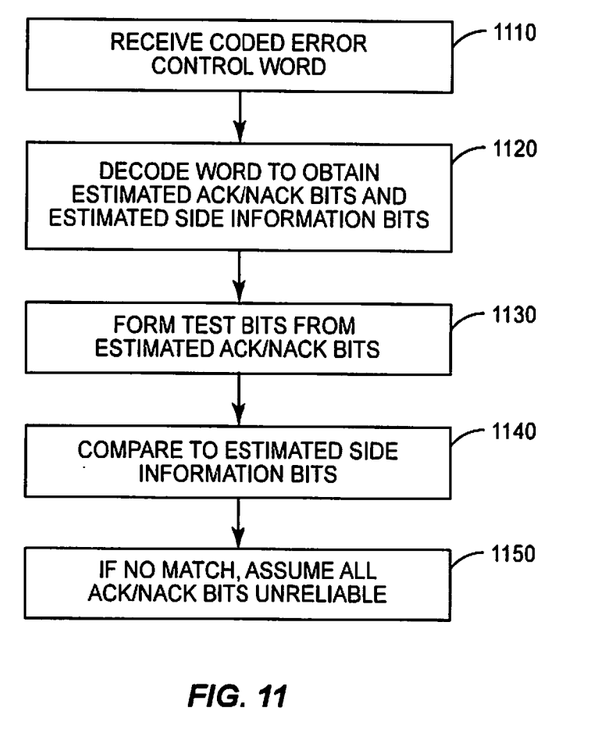
FIG. 11 is a process flow diagram for processing a received error control word that has been formed according to one or more embodiments.

With the preceding discussion in mind, those skilled in the art will appreciate that the process flow diagrams of FIGS. 9, 10, and 11 provide exemplary embodiments of methods for generating and/or processing error control information in a communication system, such as an LTE system. In particular, FIGS. 9 and 10 illustrate methods for generating error control information, based on ACK/NACK bits, for transmission to a remote node. Thus, FIGS. 9 and 10, and variations thereof, are suitable for implementation in mobile terminal 150, e.g., in the error control processing unit 150, or in any communication device that needs to send multiple ACK/NACK bits at one time. Likewise, FIG. 11 illustrates an exemplary method for processing a received error control word that has been formed according to one or more of the techniques described herein. Thus, the method of FIG. 11, and variants thereof, are suitable for implementation in a base station 110, e.g., in the ARQ processing function 130 of FIG. 1, or in any communication device that receives multiple ACK/NACK bits from a remote device. Those skilled in the art will further appreciate that these methods, as well as any of the other error control techniques discussed herein, may each be performed in one or several general-purpose or special-purpose microprocessors or other microcontrollers programmed with suitable software and/or firmware. Thus, all of the described steps of any of these techniques may be performed in a single processing device in some embodiments, or split between two or more processing devices in others.

In any event, the method pictured in FIG. 9 for generating error control information in a communication device begins with the generation of a plurality of ACK/NACK bits for corresponding received transport blocks, as shown at block

910. The determination of whether a transport block has been received correctly may be performed according to conventional means, such as with a cyclic redundancy check (CRC) or other error detection scheme. At block 920, one or more side information bits are formed, based on the ACK/NACK bits. In general, as discussed above, the side information bits provide an indication of the relative quantities of ACK values and NACK values among the ACK/NACK bits. In some embodiments, this may be as simple as generating a single side information bit that indicates whether the majority of ACK/NACK bits have NACK values, or a single bit indicating whether the majority of ACK/NACK bits have ACK values. More complex approaches will be discussed below, with reference to FIG. 10.

The process flow of FIG. 9 continues with the encoding of the ACK/NACK bits and side information bits to form an error control word, as shown at block 930. As suggested above, this encoding operation is not strictly necessary; it is possible in some embodiments to send the error control information without coding. However, the encoding process, which may employ conventional block codes, for instance, permits the ACK/NACK bits and side information bits to be transmitted over noisy channels with improved reliability.

At block 940, the ACK/NACK bits and side information bits are transmitted to the remote communication node (e.g., base station 110) for processing. In the illustrated embodiment, the encoded error control word is transmitted. In an LTE system, the encoded ACK/NACK bits and side information bits may correspond to transport blocks received in several downlink subframes; the encoded error control word may be transmitted in a single uplink subframe. As noted earlier, this approach may be necessitated by an asymmetric allocation of uplink and downlink frames in a TDD LTE system.

As suggested, above, forming the side information bits may include some degree of encoding, i.e., adding redundancy, in some embodiments. For instance, a single information bit indicating whether the majority of ACK/NACK bits have NACK values may be duplicated one or more times, to form several 'encoded' side information bits. Accordingly, an exemplary approach for encoding side information is illustrated in FIG. 10. At block 1010, a plurality of ACK/NACK bits, each of which indicates whether a corresponding transport block was successfully decoded, is evaluated to determine whether majority have NACK values. If so, a single side information bit $s_0$ is set to a value of "1", as shown at block 1020. Otherwise, $s_0$ is set to a value of "0", as shown at block 1030.

At block 1040, the side information bit $s_0$ is duplicated N times, to yield N+1 duplicate side bits. At block 1050, the N+1 duplicate side bits are encoded using a first encoder, as shown at block 1050. At block 1060, the encoded side bits and the ACK/NACK bits are encoded with a second decoder.

Either or both of these encoders may utilize any of a variety of error detection or correction techniques, such as parity bits, checksums, or block coding. As discussed earlier, neither the duplication of block 1040 nor the encoding of block 1050 may be necessary (or even desirable) in some scenarios, such as those scenarios that were discussed in detail above. However, systems designed for more complex scenarios, and/or scenarios where a greater degree of control over the error probabilities is desired, may utilize one or both of these redundancy-adding techniques to encode the side information bits.

FIG. 11 illustrates a general method for processing received error control information in a communication system. As noted above, this method might be implemented in an ARQ processing function at an LTE base station 110, for example. In any case, the pictured method begins with the reception of a coded error control word, as shown at block 1110. As will be fully appreciated by those skilled in the art, the received coded error control word may generally be regarded as an estimate of the originally transmitted error control word; the received data may differ from that transmitted because of noise and/or interference in the transmission channel. At block 1120, the received code word is decoded, according to a pre-determined decoding function, to obtain a plurality of estimated ACK/NACK bits and one or more estimated side information bits. In some embodiments, this decoding may comprise two (or more) distinct decoding functions. For example, a first decoding function may yield estimated ACK/NACK bits and estimated encoded side information bits. In these embodiments, a second decoding function may be used to convert the estimated encoded side information bits into one or more estimated side information bits.

As shown at block 1130, test bits are generated from the estimated ACK/NACK bits, using a side information generation function identical to that used at the remote communication node to create the side information. If these test bits match the estimated side bits, as determined by the comparison pictured at block 1140, then it is very likely that the estimated ACK/NACK bits were reliably received. If not, then some embodiments of the present invention simply assume that all ACK/NACK bits are unreliable, as shown at block 1150. Although this may result in the unnecessary retransmission of one or more transport blocks, the resulting system performance will still be better than conventional error control schemes, if an appropriate side information generation and transmission scheme is selected.

The preceding descriptions of various embodiments of methods and apparatus for generating and processing error control information in a communication system are given for purposes of illustration and example. Those skilled in the art will appreciate, of course, that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method of generating error control information in a communication device, the method comprising:
   generating a plurality of ACK/NACK bits, each ACK/NACK bit indicating whether a corresponding transport block received from a remote communication node was successfully decoded;
   forming one or more side information bits as a function of the ACK/NACK bits, the side information bits indicating the relative quantities of ACK values and NACK values among the ACK/NACK bits; and
   transmitting the ACK/NACK bits and the one or more side information bits to the remote communication node.

2. The method of claim 1, further comprising encoding the ACK/NACK bits and the one or more side information bits to form a coded error control word, and wherein transmitting the ACK/NACK bits and the side information bits comprises transmitting the coded error control word.

3. The method of claim 2, wherein encoding the ACK/NACK bits and the one or more side information bits comprises encoding the ACK/NACK bits and side information bits using at least one block encoder.

4. The method of claim 3, wherein encoding the ACK/NACK bits and the one or more side information bits comprises jointly encoding the ACK/NACK bits and the one or more side information bits using a single block encoder.

5. The method of claim 1, wherein the ACK/NACK bits correspond to transport blocks received in two or more downlink subframes and wherein the ACK/NACK bits and the side information bits are transmitted in a single uplink subframe.

6. The method of claim 1, wherein forming one or more side information bits comprises generating at least one side information bit indicating whether the majority of the ACK/NACK bits have NACK values.

7. The method of claim 6, wherein forming one or more side information bits further comprises generating two or more duplicate side information bits indicating whether the majority of the ACK/NACK bits have NACK values.

8. A method of processing error control information in a communication system, the method comprising:
   receiving and estimating a plurality of ACK/NACK bits and one or more side information bits transmitted by a remote communication device, each ACK/NACK bit indicating whether a corresponding transport block received by the remote communication device was successfully decoded and the one or more side information bits indicating the relative quantities of ACK values and NACK values among the ACK/NACK bits; and
   evaluating the estimated ACK/NACK bits in view of the estimated side information bits to determine the reliability of the estimated ACK/NACK bits.

9. The method of claim 8, wherein receiving and estimating ACK/NACK bits and side information bits comprises receiving a coded error control word transmitted by the remote communication device and decoding the coded error control word to obtain the estimated ACK/NACK bits and the estimated one or more side information bits.

10. The method of claim 9, wherein decoding the coded error control word comprises decoding the coded error control word using at least one block decoder.

11. The method of claim 8, wherein evaluating the estimated ACK/NACK bits comprises:
   forming one or more test bits as a function of the estimated ACK/NACK bits, the test bits indicating the relative quantities of ACK values and NACK values among the estimated ACK/NACK bits; and
   comparing the test bits to the estimated side information bits to determine the reliability of the estimated ACK/NACK bits.

12. The method of claim 11, wherein forming one or more test bits comprises generating at least one test bit indicating whether a majority of the estimated ACK/NACK bits have NACK values.

13. The method of claim 12, wherein forming one or more test bits comprises generating two or more duplicate test bits indicating whether a majority of the estimated ACK/NACK bits have NACK values.

14. The method of claim 8, wherein evaluating the estimated ACK/NACK bits in view of the estimated side information bits comprises determining a reliability metric for each of the estimated ACK/NACK bits as a function of the estimated side information bits and assessing the reliability of each estimated ACK/NACK bit based on the corresponding reliability metric.

15. The method of claim 8, further comprising assuming that none of the transport blocks were successfully decoded, in response to a determination that the estimated ACK/NACK bits are unreliable.

16. A wireless communication device comprising one or more processing circuits configured to:
   receive a plurality of transport blocks from a remote communication node and to generate a plurality of corresponding ACK/NACK bits indicating whether each transport block was successfully decoded;
   form one or more side information bits as a function of the ACK/NACK bits, the side information bits indicating the relative quantities of ACK values and NACK values among the ACK/NACK bits; and
   transmit the ACK/NACK bits and the one or more side information bits to the remote communication node.

17. The wireless communication device of claim 16, wherein the one or more processing circuits are further configured to encode the ACK/NACK bits and the one or more side information bits to form a coded error control word, and are configured to transmit the ACK/NACK bits and the one or more side information bits by transmitting the coded error control word to the remote communication node.

18. The wireless communication device of claim 17, wherein the ACK/NACK bits correspond to transport blocks received in two or more downlink subframes and wherein the coded error control word is transmitted in a single uplink subframe.

19. The wireless communication device of claim 16, wherein the one or more processing circuits are configured to generate at least one side information bit indicating whether the majority of the ACK/NACK bits have NACK values.

20. The wireless communication device of claim 19, wherein the one or more processing circuits are configured to generate two or more duplicate side information bits indicating whether the majority of the ACK/NACK bits have NACK values.

21. The wireless communication device of claim 16, wherein the one or more processing circuits are configured to encode the ACK/NACK bits and side information bits using at least one block encoder.

22. The wireless communication device of claim 21, wherein the one or more processing circuits are configured to encode the ACK/NACK bits and side information bits by jointly encoding the ACK/NACK bits and the one or more side information bits using a single block encoder.

23. A wireless communication device comprising one or more processing circuits configured to:
   receive and estimate a plurality of ACK/NACK bits and one or more side information bits transmitted by a remote communication device, each ACK/NACK bit indicating whether a corresponding transport block received by the remote communication device was successfully decoded and the one or more side information bits indicating the relative quantities of ACK values and NACK values among the ACK/NACK bits; and
   evaluate the estimated ACK/NACK bits in view of the estimated side information bits to determine the reliability of the estimated ACK/NACK bits.

24. The wireless communication device of claim 23, wherein the one or more processing circuits are configured to receive and estimate the ACK/NACK bits and the one or more side information bits by receiving a coded error control word transmitted by the remote communication device and decoding the coded error control word to obtain the estimated ACK/NACK bits and the estimated one or more side information bits.

25. The wireless communication device of claim 24, wherein the one or more processing circuits are configured to decode the coded error control word using at least one block decoder.

26. The wireless communication device of claim 23, wherein the one or more processing circuits are configured to evaluate the estimated ACK/NACK bits by:
   forming one or more test bits as a function of the estimated ACK/NACK bits, the test bits indicating the relative quantities of ACK values and NACK values among the estimated ACK/NACK bits; and
   comparing the test bits to the estimated side information bits to determine the reliability of the estimated ACK/NACK bits.

27. The wireless communication device of claim 26, wherein the one or more processing circuits are configured to generate at least one test bit indicating whether a majority of the estimated ACK/NACK bits have NACK values.

28. The wireless communication device of claim 27, wherein the one or more processing circuits are configured to generate two or more duplicate test bits indicating whether a majority of the estimated ACK/NACK bits have NACK values.

29. The wireless communication device of claim 23, wherein the one or more processing circuits are configured to evaluate the estimated ACK/NACK bits by:
   determining a reliability metric for each of the estimated ACK/NACK bits as a function of the estimated side information bits; and
   assessing the reliability of each estimated ACK/NACK bit based on the corresponding reliability metric.

30. The wireless communication device of claim 23, wherein the one or more processing circuits are configured to assume that none of the transport blocks were successfully decoded, in response to a determination that the estimated ACK/NACK bits are unreliable.

* * * * *

UNITED STATES PATENT AND TRADEMARK OFFICE
CERTIFICATE OF CORRECTION

PATENT NO. : 8,537,853 B2
APPLICATION NO. : 12/933301
DATED : September 17, 2013
INVENTOR(S) : Falahati et al.

It is certified that error appears in the above-identified patent and that said Letters Patent is hereby corrected as shown below:

In the Specification

In Column 3, Line 14, delete "show" and insert -- shows --, therefor.

In Column 5, Line 57, delete "ACK/NAK" and insert -- ACK/NACK --, therefor.

In Column 7, Line 8, delete "a is a" and insert -- is a --, therefor.

In Column 9, Line 27, delete "(OPSK)" and insert -- (QPSK) --, therefor.

In Column 10, Line 46, delete "error control processing unit 150," and insert -- error control processing unit 170, --, therefor.

Signed and Sealed this
Fifteenth Day of April, 2014

Michelle K. Lee
*Deputy Director of the United States Patent and Trademark Office*